(12) United States Patent
Hall et al.

(10) Patent No.: US 6,487,525 B1
(45) Date of Patent: Nov. 26, 2002

(54) METHOD FOR DESIGNING A HVAC AIR HANDLING ASSEMBLY FOR A CLIMATE CONTROL SYSTEM

(75) Inventors: Timothy J. Hall, Novi, MI (US); Daniel Comelius Bach, Belleville, MI (US); Frederick Abraham Karam, Allen Park, MI (US); William Francis Weber, Bloomfield Hills, MI (US); Ramon Banuelos, Frasier, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/356,576

(22) Filed: Jul. 19, 1999

(51) Int. Cl.[7] .............................................. G06F 17/50
(52) U.S. Cl. .................................. 703/7; 703/1; 706/47
(58) Field of Search ...................... 703/1, 7, 27; 706/47, 706/61

(56) References Cited

U.S. PATENT DOCUMENTS

| | | | |
|---|---|---|---|
| 4,912,657 A | | 3/1990 | Saxon et al. |
| 5,070,534 A | | 12/1991 | Lascelles et al. |
| 5,111,413 A | | 5/1992 | Lazansky et al. |
| 5,197,120 A | | 3/1993 | Saxton et al. |
| 5,293,479 A | | 3/1994 | Quintero et al. |
| 5,799,293 A | | 8/1998 | Kaepp |
| 5,953,517 A | * | 9/1999 | Yin et al. ................. 395/500.1 |
| 6,090,148 A | * | 7/2000 | Weber et al. .................. 703/8 |
| 6,096,087 A | * | 8/2000 | Weber et al. .................. 703/8 |
| 6,110,216 A | * | 8/2000 | Weber et al. .................. 703/8 |
| 6,113,643 A | * | 9/2000 | Weber et al. .................. 703/8 |
| 6,119,125 A | * | 9/2000 | Gloudeman et al. ......... 707/103 |
| 6,209,794 B1 | * | 4/2001 | Webster et al. ............... 236/94 |

OTHER PUBLICATIONS

SAE Recommended Practice, "Passenger Car Windshield Wiper Systems–SAE J903c", Nov. 1973.
SAE Recommended Practice, "Motor Vehicle Driver And Passenger Head Position–SAE J1052", May 1987.
SAE Recommended Practice, "Driver Hand Control Reach–SAE J287", Jun. 1988.
SAE Recommended Practice, "Passenger Car Glazing Shade Bands–SAE J100", Mar. 1988.
SAE Recommended Practice, "Accommodation Tool Reference Point–SAE J1516", Mar. 1990.

(List continued on next page.)

Primary Examiner—Samuel Broda
Assistant Examiner—T. Phan
(74) Attorney, Agent, or Firm—Larry I. Shelton

(57) ABSTRACT

A method for designing a HVAC air handling assembly for a climate control system on a vehicle includes the step of selecting an architecture for the HVAC air handling assembly from a library stored in a memory of a computer system and selecting a HVAC component part from the library. The method also includes the step of generating a HVAC design using the HVAC architecture and the HVAC component part, determining if the HVAC design meets a predetermined criteria, and regenerating the HVAC design if the predetermined criteria is not met.

19 Claims, 10 Drawing Sheets

OTHER PUBLICATIONS

SAE Recommended Practice, "Driver Selected Seat Position–SAE J1517", Mar. 1990.

SAE Recommended Practice, "Truck Driver Shin–Knee Position For Clutch And Accelerator–SAE J1512", Mar. 1990.

SAE Recommended Practice, "Truck Driver Stomach Position–SAE J1522", Mar. 1990.

SAE Standard, "Devices For Use In Defining And Measuring Vehicle Seating Accomodation–SAE J826", Jun. 1992.

SAE Recommended Practice, "Motor Vehicle Drivers' Eye Locations–SAE J941", Jun. 1992.

SAE Recommended Practice, "Passenger Car Windshield Defrosting Systems–SAE J902", Apr. 1993.

SAE Recommended Practice, "Windshield Wiper Systems–Trucks, Buses, And Multipurpose Vehicles–SAE J198", Jun. 1993.

SAE Recommended Practice, "Motor Vehicle Dimensions–SAE J1100", Jun. 1993.

SAE Recommended Practice,"Describing And Measuring The Driver's Field Of View–SAE J1050", Aug. 1994.

* cited by examiner

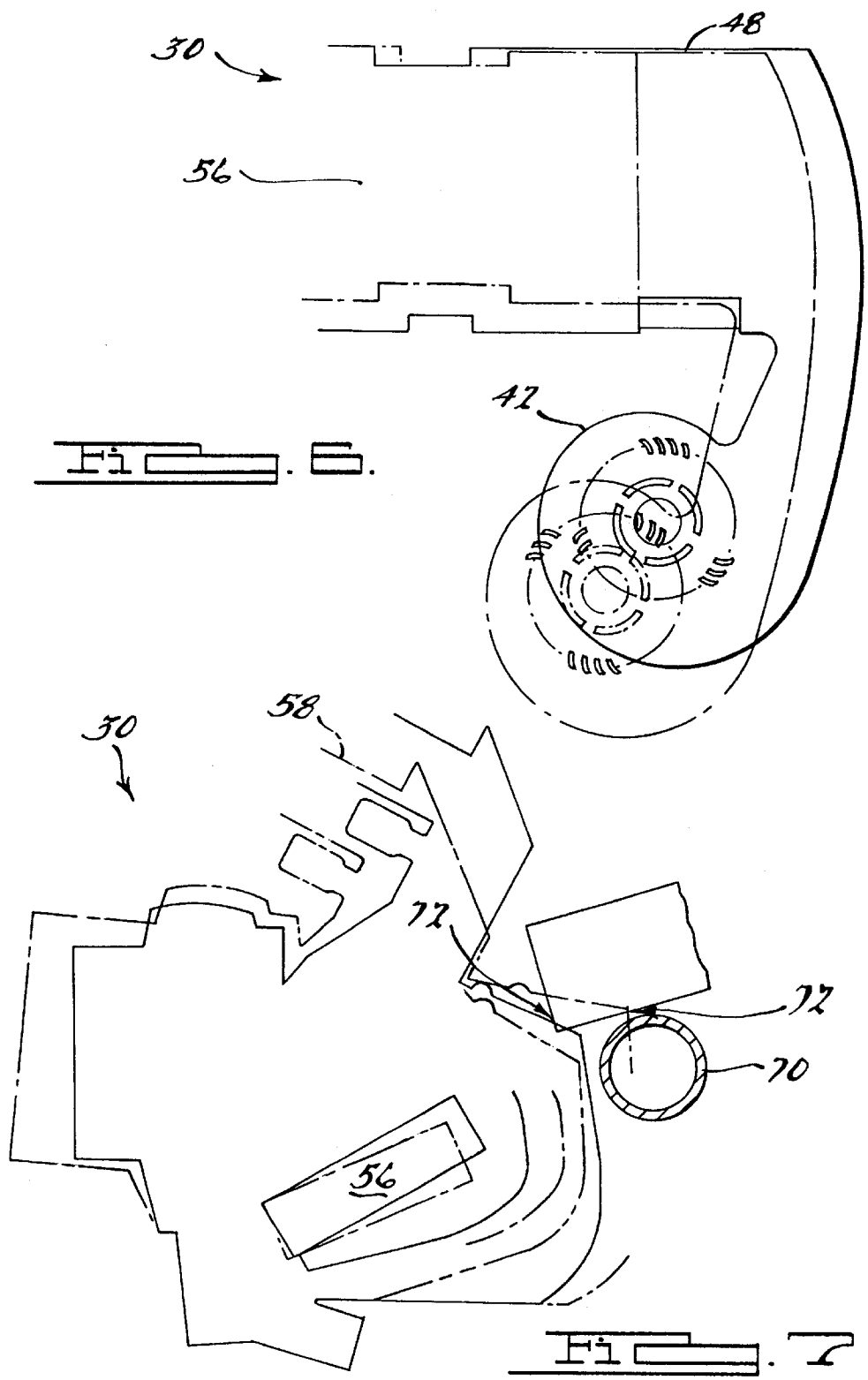

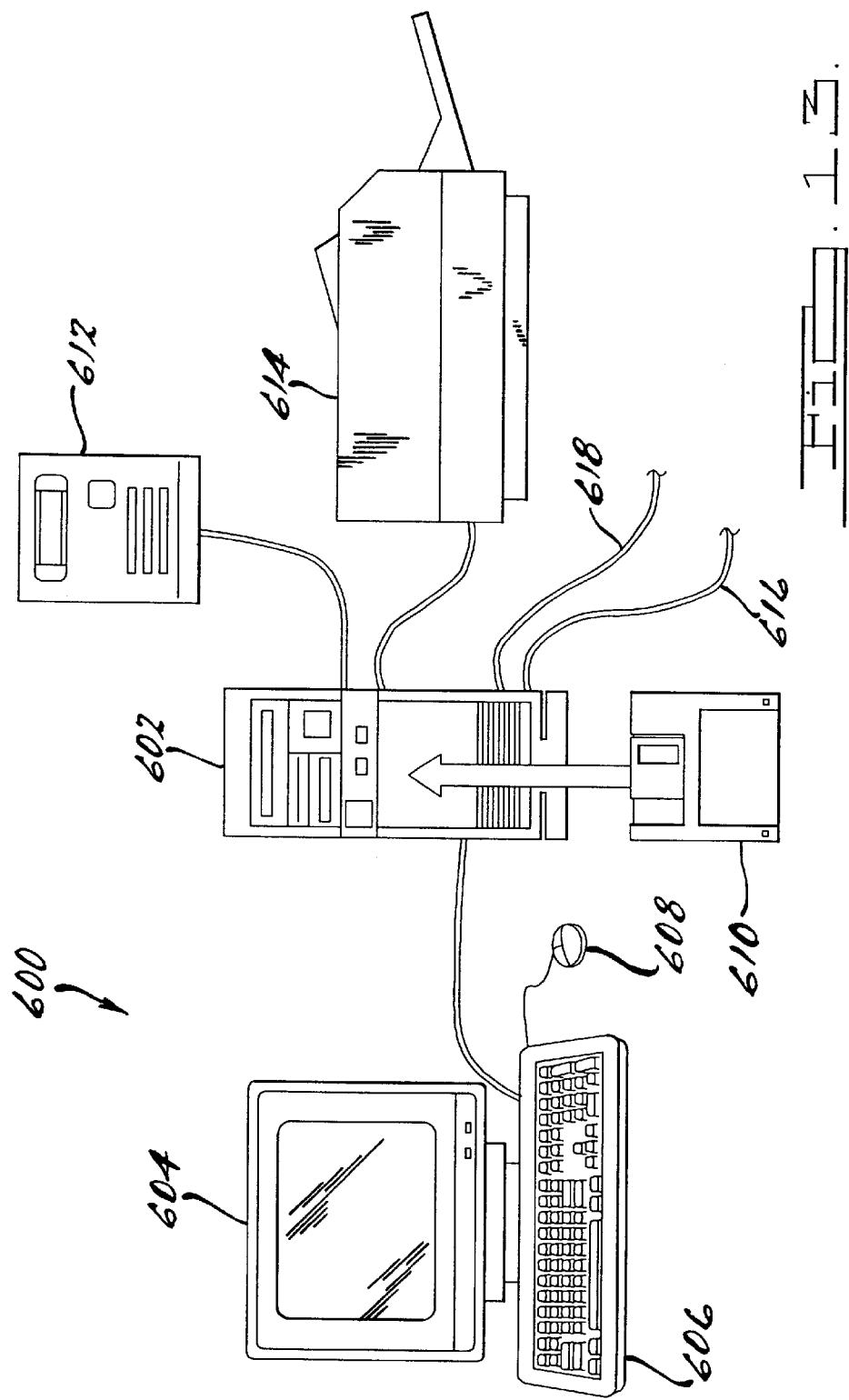

METHOD FOR DESIGNING A HVAC AIR HANDLING ASSEMBLY FOR A CLIMATE CONTROL SYSTEM

BACKGROUND OF THE INVENTION

1. Field of the Invention

The present invention relates generally to computer-aided design of vehicles and, more specifically, to a method for designing a HVAC air-handling assembly for a climate control system on a vehicle.

2. Description of the Related Art

Vehicle design, and in particular automotive vehicle design, has advanced to a state in which computer-aided design techniques are frequently incorporated in the development of a new vehicle. Computer-aided design is especially beneficial in packaging the various systems incorporated within a vehicle, to maximize design and functional capabilities of the vehicle systems. One example of a vehicle system is the climate control system. The climate control system maintains the temperature of an occupant compartment of the vehicle at a comfortable level. The climate control system provides heating, cooling and ventilation. Air handling for the climate control system is by an integrated mechanism referred to in the art as a heating, ventilation and air conditioning (HVAC) assembly. The HVAC assembly is typically positioned on the passenger side of the dash panel, below the instrument panel.

One aspect of the packaging task for a vehicle system, such as the HVAC assembly, is to ensure that it is spatially compatible with a particular environment, while still complying with predetermined functional criteria, including performance and durability requirements. In the past, various methods have been utilized to determine whether a proposed design meets such predetermined parameters. For example, a proposed design may be analyzed in two dimensions, which requires many iterations of a drawing. A three-dimensional model may also be constructed to obtain a better perspective of the design. The three-dimensional model may further be subjected to testing to determine whether it complies with performance and durability criteria. This method is time consuming and expensive.

It is also known that design methods that are knowledge-based are being utilized to design a vehicle system. The knowledge-based design method provides advice to the user of the method based on the environment of the design application used. Advantageously, knowledge-based design techniques maximize the amount of knowledge utilized, while developing a new vehicle system in a minimal period of time. An example of a knowledge-based design technique is disclosed in commonly assigned U.S. Pat. No. 5,799,293 to Kaepp, entitled "Method For Optimizing The Design Of A product Using Knowledge Based Engineering Techniques", the disclosure of which is hereby incorporated by reference.

It is also known to use a computer-aided design technique to design a vehicle system. An example of a computer aided design technique is disclosed in commonly assigned U.S. patent application, Ser. No. 08/984,806, entitled "Method and System For Vehicle Design Using Occupant Reach Zones", the disclosure of which is hereby incorporated by reference.

While the above design techniques work well, they do not take into account the particular functional and packaging criteria associated with designing a HVAC assembly for a climate control system. Therefore, there is a need in the art to provide a method for designing a HVAC assembly for a vehicle using a computer aided design and engineering technique that accommodates functional and packaging criteria.

SUMMARY OF THE INVENTION

Accordingly, the present invention is a method for designing a HVAC air handling assembly for a climate control system on a vehicle. The method includes the step of selecting an architecture for the HVAC air handling assembly from a library stored in a memory of a computer system and selecting a HVAC component part from the library. The method also includes the step of generating a HVAC design using the HVAC architecture and the HVAC component part, determining if the HVAC design meets a predetermined criteria, and regenerating the HVAC assembly design if the predetermined criteria is not met.

One advantage of the present invention is that an improved method of designing a HVAC assembly for a climate control system on a vehicle is provided that considerably reduces design time and related expenses. Another advantage of the present invention is that a method of designing a HVAC assembly for a climate control system is provided that considers packaging criteria. Yet another advantage of the present invention is that a method of designing a HVAC assembly for a climate control system is provided that allows further analysis of vehicle packaging feasibility early in the design process. Still another advantage of the present invention is that a method of designing a HVAC assembly for a climate control system is provided which supports computer-aided engineering analysis (CAE) and rapid prototyping.

A further advantage of the present invention is that a method of designing a HVAC assembly for a climate control system is provided which enhances informed decision making regarding the design in furtherance of vehicle timing considerations. Yet a further advantage of the present invention is that a method of designing a HVAC assembly for a climate control system is provided that enhances flexibility in climate control system design, while still meeting vehicle timing considerations. Still a further advantage of the present invention is that a method of designing a HVAC assembly for a climate control system is provided that utilizes parametric automated design in light of predetermined criteria.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 6 is a sectional view taken along line 6—6 of the HVAC assembly of FIG. 2.

FIG. 7 is a sectional view taken along line 7—7 of the HVAC assembly of FIG. 5.

FIG. 13 is a view of a system for designing the HVAC air handling assembly for a climate control system in an automotive vehicle, according to the present invention.

DESCRIPTION OF THE PREFERRED EMBODIMENT(S)

Vehicle design, and in particular the design of a HVAC assembly for a climate control system on a vehicle, is achieved according to the present invention with a generic parametric driven design process. Advantageously, this process allows flexibility in vehicle design and engineering analysis of the design in a fraction of the time required using conventional design methods. Various computer based tools are integrated to achieve this enormous time and expense savings, including solid modeling, parametric design, automated studies and a non-parametric components library, also referred to as a standard parts library.

Figure 1:
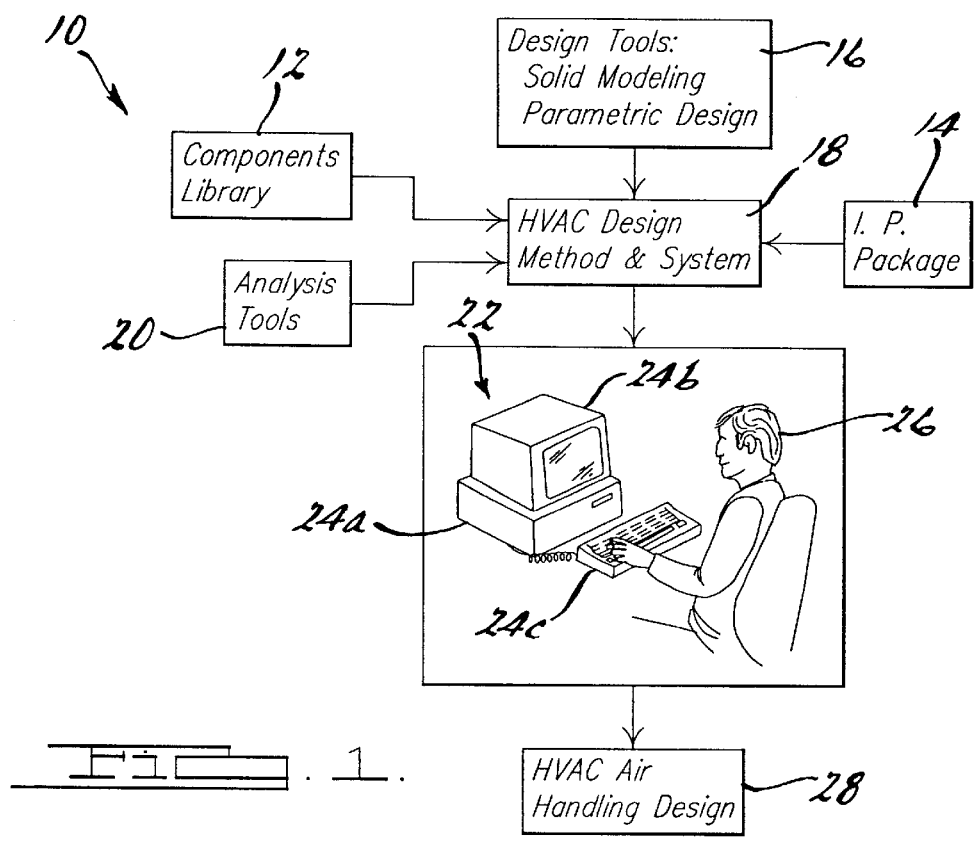
FIG. 1 is a block diagram of a system which may be utilized with a method for designing a HVAC air handling assembly for a climate control system on a vehicle, according to the present invention.

Referring to the drawings and in particular FIG. 1, the tools 10 used by a method for designing a HVAC air handling assembly 18, according to the present invention, is illustrated graphically. The tools 10 include a component parts library 12 stored on an electronic storage device (not shown). The component parts library 12 is a database providing an electronic representation of various types of component parts used on a HVAC air handling assembly, to be described. The component parts library 12 also includes information in electronic form regarding various types of HVAC air handling assembly architectures (to be described). Packaging studies with these component parts can be done to assess many factors relating to the HVAC air handling assembly 30.

The tools 10 also include a vehicle platform library 14 stored on the electronic storage device. The vehicle platform library 14 is an electrical representation of a vehicle platform or a portion thereof. For example, the vehicle platform library 14 may include information regarding an instrument panel, to be described. It should be appreciated that the vehicle platform library 14 and component parts library 12 may be stored on the same electronic storage device.

The tools 10 may also include various design tools, shown generally at 16, which can be used for this design method, to be described. These design tools 16 may include solid modeling and parametric design techniques. Solid modeling, for example, takes electronically stored vehicle platform data from the vehicle platform library 14 and standard component parts data from the component parts library 12 and builds complex geometry for part-to-part or full assembly interference checking. Several modeling programs are commercially available and generally known to those skilled in the art.

The parametric design technique is used in the electronic construction of vehicle geometry within a computer system 22 (to be described) for designing a vehicle system, such as the HVAC assembly. As a particular dimension or parameter is modified, the computer 24 is instructed to regenerate a new vehicle or part geometry. The parametric instrument panel information, generally indicated at 14, control and limit the design process in accordance with predetermined design parameters, to be described.

The tools 10 also include various computer-aided engineering (CAE) analysis methods. One example of an engineering analysis technique is computational fluid dynamics (CFD) 20, to be described.

The tools 10 further include a computer system 22 as is known in the art to implement the method. The computer system 22 includes a processor and a memory 24a, which can provide a display and animation of a system, such as the HVAC assembly, on a display such as a video terminal 24b. Parametric selection and control for the design can be achieved by a user 26, via a user interactive device 24c, such as a keyboard or a mouse. The user 26 inputs a set of parameters and set of instructions into the computer 24a when prompted to do so. The set of parameters and the set of instructions may be product specific, wherein other data and instructions non-specific to the product may already be stored in the computer 24a.

One example of an input method is a pop-up window with all current parameters, including an online description for the parameter and a current value therefore. For example, parametric values may be chosen from a table within a two-dimensional mode, since some vehicle designers prefer to view an assembly in sections which can be laid out on a drawing.

Once the computer system 22 receives the set of parameters and instructions from the user 26, and any information regarding related vehicle systems and information from the libraries 12, 14, the computer system 22 utilizes a method, discussed in detail subsequently, to determine whether requirements have been met.

Advantageously, the computer implemented method of designing a HVAC air handling assembly 18 combines all of the foregoing to provide an efficient, flexible, rapid design 28 for a HVAC assembly for climate control system on a vehicle. Further, a HVAC air handling system design 28 is an output of the method and the design 28 is available for further analysis and study.

Referring to FIGS. 2 and 4 through 7, a HVAC air handling assembly 30 for a climate control system (not shown) is illustrated. It should be appreciated that the HVAC air handling assembly 30 is part of a climate control system for a vehicle (not shown), as is well known in the art. The climate control system generally includes a heating system, an air conditioning system, and a ventilation system.

The climate control system also includes an air-flow handling system, referred to in the art as a heating, ventilation and air conditioning (HVAC) air handling assembly 30. The HVAC air handling assembly 30 conditions a flow of air by heating or cooling the airflow and distributing the flow of conditioned air to the interior of the occupant compartment (not shown) of the vehicle. It should be appreciated that in this example, the HVAC air handling assembly 30 is positioned on the occupant compartment side of a dash panel (not shown), below an instrument panel (not shown). Also, in this example, the HVAC air handling assembly 30 includes a case 32, having a preferred architecture, to package the individual component parts of the HVAC air handling assembly 30, to be described.

The HVAC air handling assembly 30 includes an air inlet duct 34. The air inlet duct 34 is generally a rectangular member, and includes an interior chamber that is hollow. The air inlet duct 34 includes an inlet opening to allow the ingress of air into the interior chamber. The air inlet duct 34 receives air from outside of the vehicle, or recirculated air from inside the occupant compartment of the vehicle. In this example, there is an outside air inlet opening 36 for receiving outside air, and inside air inlet opening 37 for receiving recirculated air. Preferably, the openings 36,37 are covered by a door (not shown) that operably controls the ingress of air. It should be appreciated that the size of the air inlet duct 34 and position relative to the case 32 is part of the HVAC assembly architecture. The air inlet duct 34 also includes an egress opening 38 for the air to leave the interior chamber of the air inlet duct 34.

The HVAC air handling assembly 30 also includes a blower assembly 40 operably connected to the egress opening 38 in the air inlet duct 34. The blower assembly 40 pulls air through the air inlet duct 34 and forces it through the rest of the HVAC air handling assembly 30, in a manner to be described. The blower assembly 40 includes a scroll assembly 42 having a wheel 44 and a motor 46, as it is known in the art. Preferably, the motor 46 is part of a centrifugal blower function for the blower assembly 40.

The HVAC air handling assembly 30 further includes an evaporator core 48 operably connected to the blower assembly 40, that receives the flow of air to be conditioned. It should be appreciated that, in this example, there is a filter 50 positioned between the blower assembly 40 and the evaporator core 48, to filter the air before it passes through the evaporator core 48. The evaporator core 48 cools and dehumidifies the air to be conditioned, by the thermodynamic transfer of heat from the air to be conditioned to a refrigerant, as is known in the art.

The HVAC air handling assembly 30 also includes a blend door 52 that diverts the flow of air leaving the evaporator core 48 to adjust the temperature of the air. It should be appreciated that the blend door 52 may be actuated by an actuator 54. The actuator 54 may be electrically operated, mechanically operated, or vacuum operated, as is known in the art. A blend door 52 directs the flow of air either into a heater core 56, to be described, or to bypass the heater core 56, or partially through the heater core 56.

The HVAC air handling assembly 30 includes a heater core 56 that receives a flow of air to be heated, and heats the air by the thermodynamic transfer of heat from a coolant. Automotive HVAC systems that use alternative methods to control the HVAC temperature output also exists. These methods can be controlling the coolant flow to the heater core or using sliding air mix doors. This methodology still applies to these systems The HVAC air handling assembly 30 also includes an mode door through which the flow of conditioned air from the evaporator core, or heater core, or both, exits the HVAC air handling assembly 30. In this example, a first mode door 60 operatively directs the flow of now conditioned air through a panel duct (not shown) in the instrument panel and into the occupant compartment. A second mode 61 operably directs the flow of conditioned air through a floor duct 64 positioned near the floor of the vehicle in the instrument panel. It should be appreciated that the first air mix door 60 can also divert air through a plenum 58 and defroster duct opening.

Figure 3:
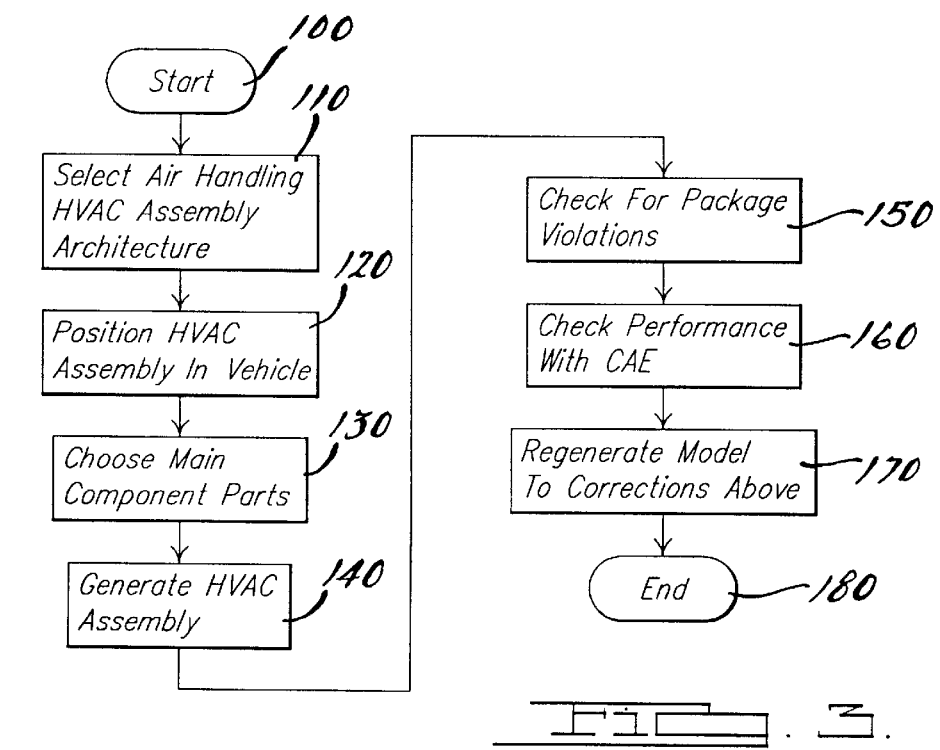
FIG. 3 is a flowchart of a method for designing a HVAC air handling assembly for a climate control system on a vehicle, according to the present invention, for the HVAC assembly of FIG. 2.
Figure 2:
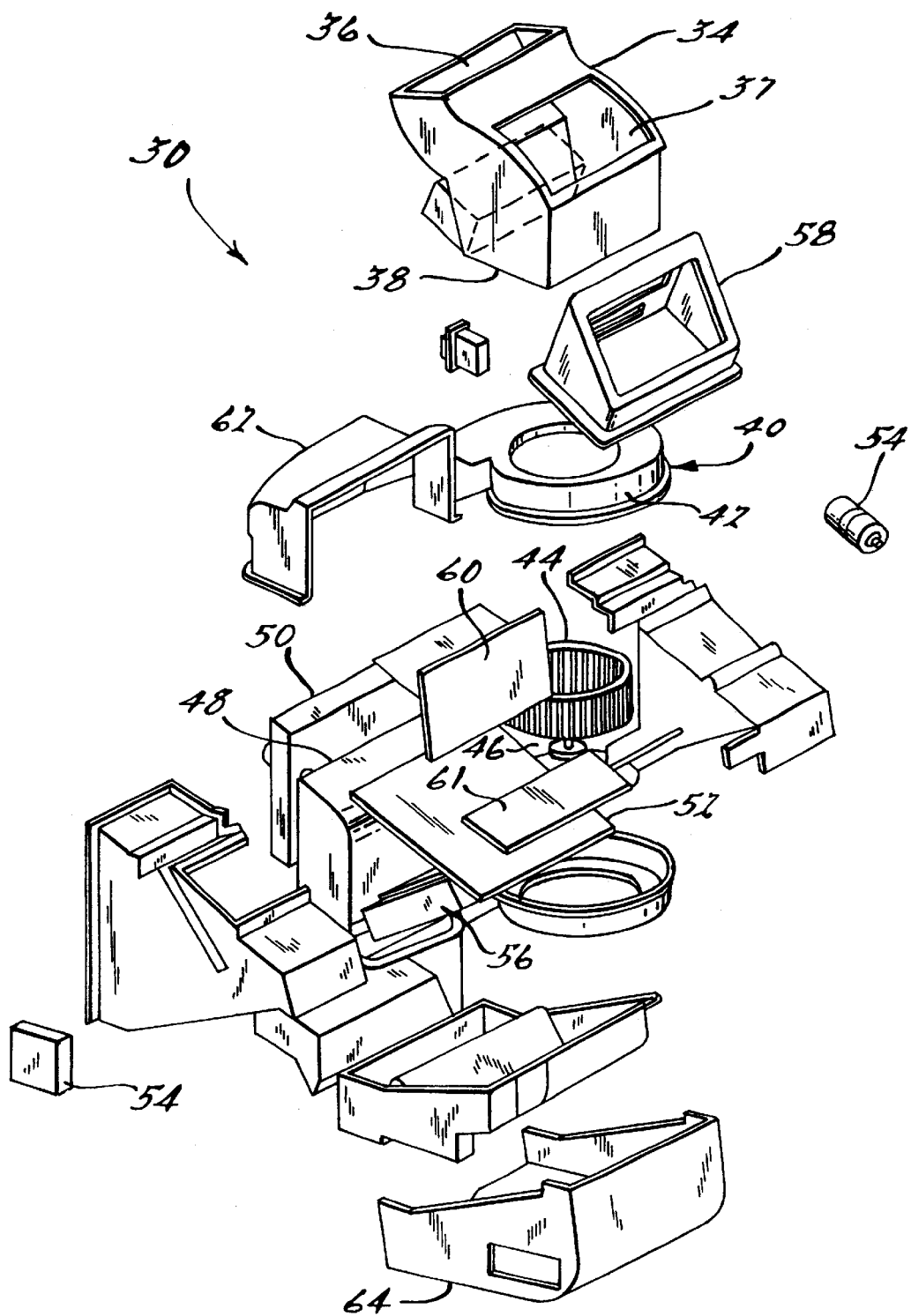
FIG. 2 is an exploded view of a HVAC air handling assembly for a climate control system.
Figure 4:
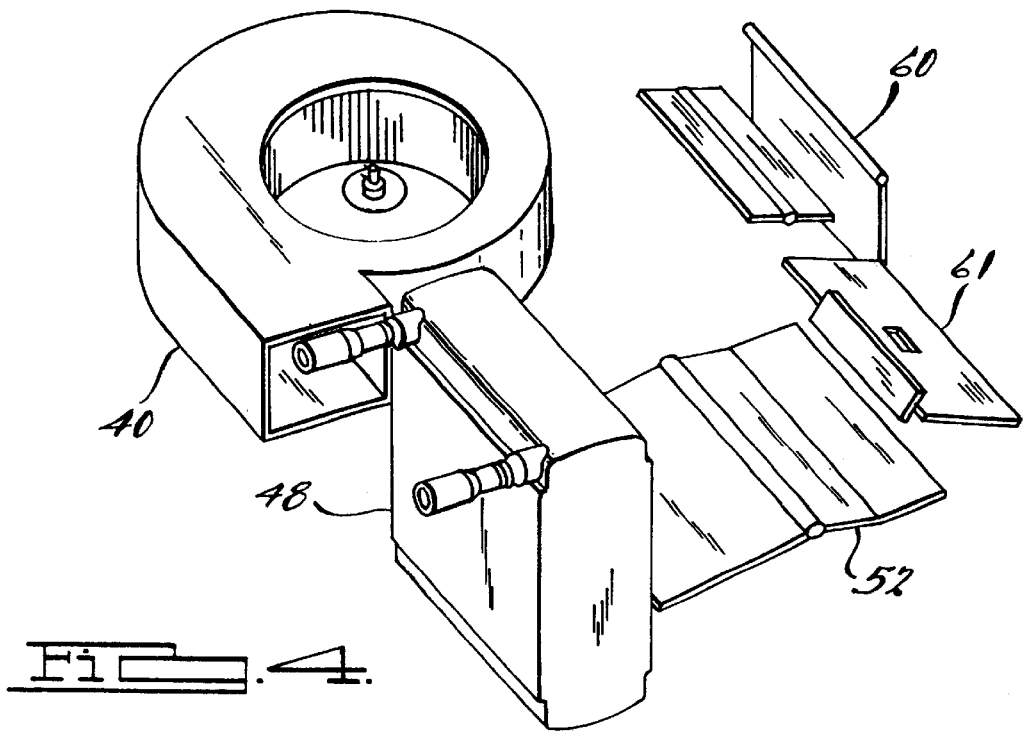
FIG. 4 is a perspective view of a blower assembly, evaporator core and air mix doors for the HVAC assembly of FIG. 2.
Figure 5:
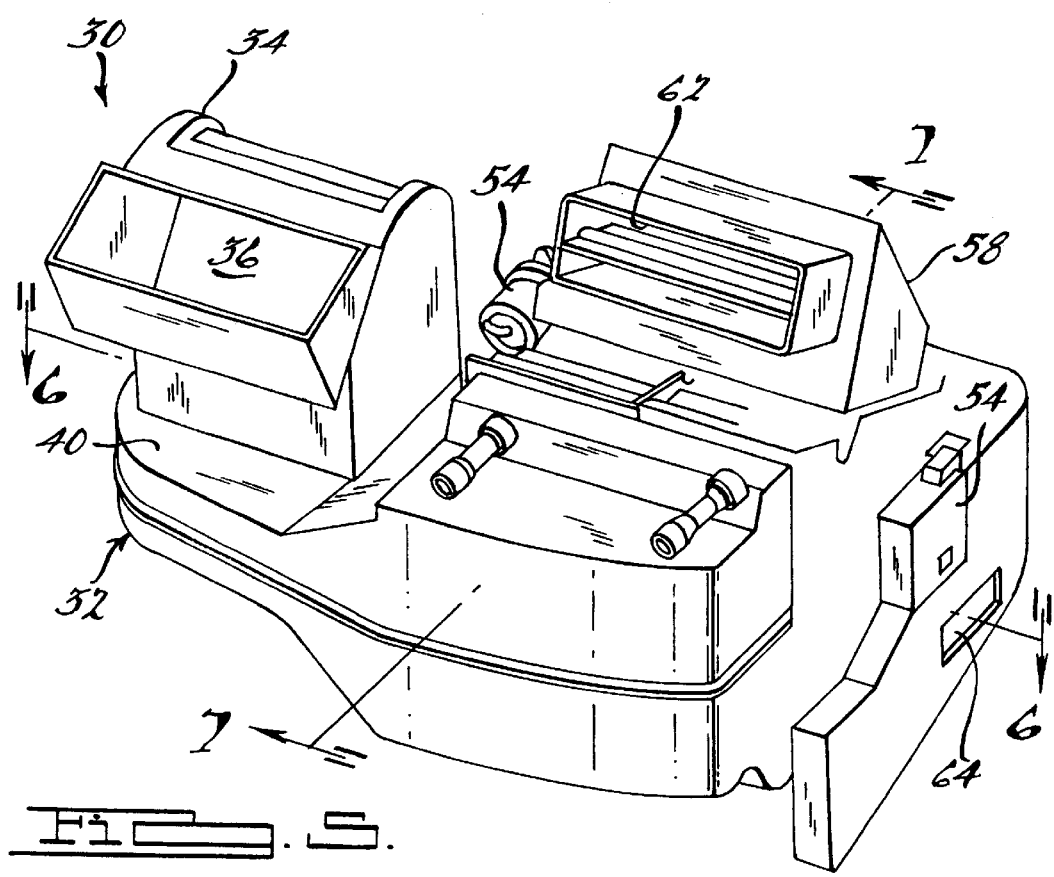
FIG. 5 is a perspective view of the HVAC assembly of FIG. 2.

Referring to FIG. 3, a flowchart of a method for designing the HVAC air handling assembly 30 for a climate control system using computer-aided design and engineering techniques, according to the present invention, is illustrated. The methodology begins in bubble 100, when it is called for by the user 26. The methodology advances to block 110 and selects an architecture for the HVAC air handling system 30 for a particular vehicle from the component parts library 12. It should be appreciated that the term architecture refers to the placement of components parts within an assembly. In this example, the architecture of the HVAC air handling assembly 30 refers to the generic positioning of the component parts and features included with the HVAC air handling assembly 30 to form the shape of the HVAC assembly case 32.

The methodology advances to block 120 and the HVAC air handling assembly 30 is positioned in the vehicle. In this example, the HVAC assembly 30 is positioned under the instrument panel. It should be understood that the use of the term vehicle implies an electronic representation of at least a portion of a vehicle, such as the dash panel and instrument panel, from the vehicle platform library 14. It should also be appreciated that the orientation of the HVAC air handling assembly 30 includes specifying or selecting values from a set of HVAC air handling assembly parameters in the component parts library 12. These HVAC assembly parameters can be modified to conform with existing vehicle parameters, such as a three-dimensional location of a cross-car support beam 70.

The methodology advances to block 130 and selects from the component parts library 12 a specific component part to be included in the HVAC air handling assembly 30 based on a specific characteristic of the component part. An example of a component part includes the air inlet duct 34, blower assembly 40, evaporator core 48, heater core 56, plenum 58, or ducts 62, 64. More specifically, a component part is selected based upon a predetermined functional criteria, as established by the user 26. An example of a functional criteria related to the performance of a heater core 56 is a specific resistance to airflow, or a specific heat output.

It should be appreciated, that the positioning of the HVAC air handling assembly 30 in block 120 and choice of specific component parts in block 130 need not be accomplished in the order indicated in FIG. 3, but can be done in reverse order, or intermingled, that is, various systems may be packaged, the HVAC air handling assembly 30 oriented, and other vehicle systems subsequently packaged.

The methodology advances to block 140 and the HVAC design of the HVAC air handling assembly 30 is generated electronically, including the selected HVAC assembly architecture and component parts, and packaging with respect to the vehicle. Preferably, the appropriate relationships between the HVAC air handling assembly 30, other vehicle systems, and the vehicle, are automatically determined and based upon the generated HVAC design 28.

It should be appreciated that packaging refers to an electronic representation of the dimensions of the system, device, or component as it is geometrically related to a three-dimensional reference frame of the vehicle. These vehicle systems may include, but are not limited to the instrument panel, the dash panel, cross-car support beam 70, HVAC air handling assembly 30, air bags (not shown) and steering column (not shown). A vehicle system is intended to include any part of the vehicle which will interact with the HVAC air handling assembly 30, either directly, or indirectly.

The methodology advances to block 150 and checks if the packaging of the HVAC air handling assembly 30 meets a predetermined packaging criteria. An example of a predetermined packaging criteria is a sufficient dimensional distance or clearance between the HVAC air handling assembly 30 and another vehicle system, such as the cross car support beam 70. Referring to FIG. 7, a potential interference 72 between the case 32 (shown in dot dash) and cross car support beam 70 is illustrated.

Figure 8:
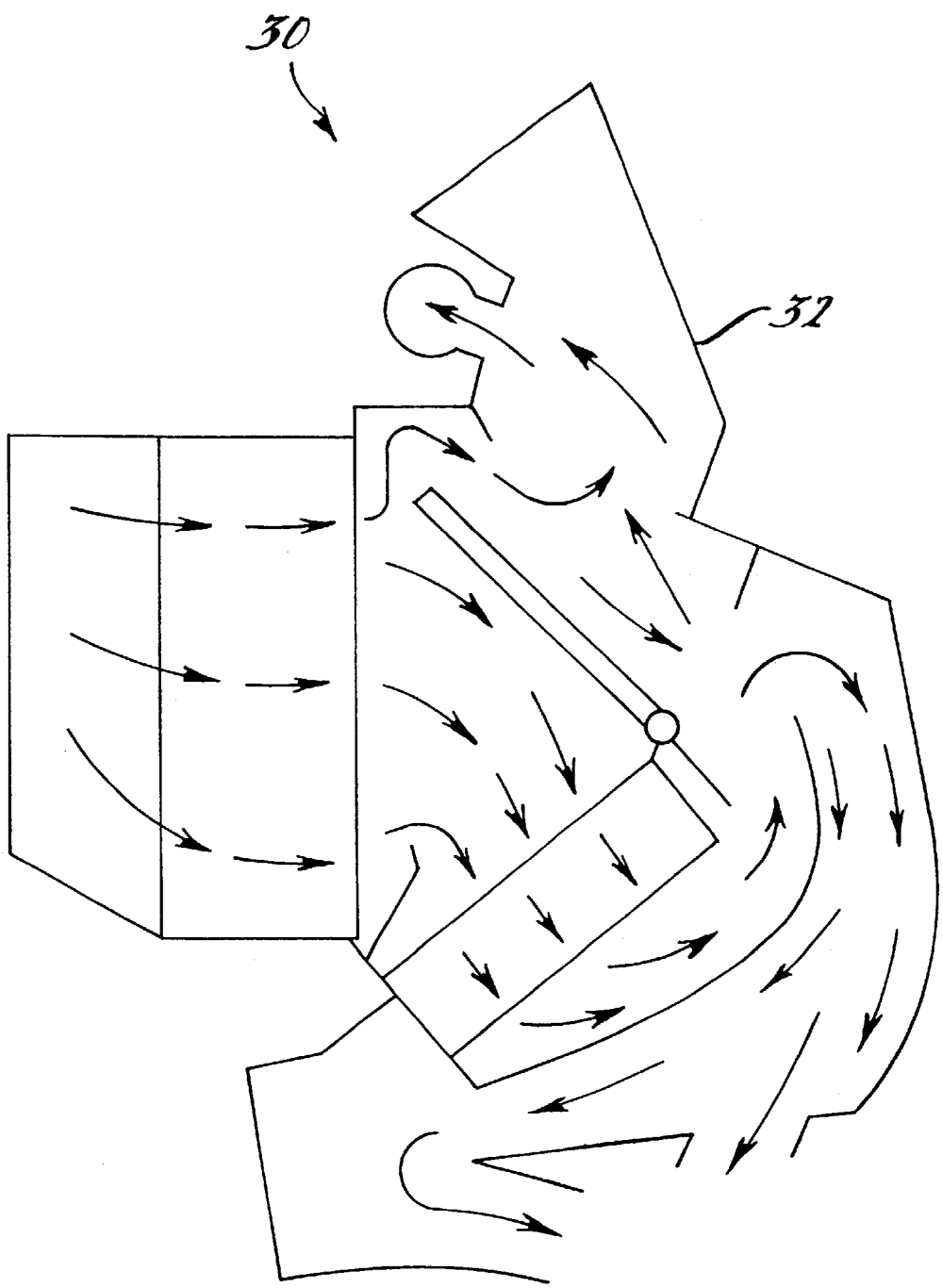
FIG. 8 is a sectional view taken along line 7—7 of the HVAC assembly of FIG. 5 illustrating airflow through the assembly.

The methodology advances to block 160 and checks if the performance of the HVAC air handling assembly 30 meets a predetermined functional criteria using a computer-aided engineering analysis technique. In this example, an analytical computer-aided design technique such as computational fluid dynamics (CFD) modeling 20 is utilized to determine he functional performance of the HVAC air handling assembly 30. Such functional performance characteristics may include airflow quantity and velocity, interior airflow details (as shown in FIG. 8), interior airflow pressure, and temperature stratification. Other engineering techniques known in the art may likewise be utilized to determine the functional characteristics of the HVAC air handling assembly 30.

It should also be appreciated that the interaction of the HVAC air handling assembly 30 with these packaging and functional criteria can be communicated to the user 26, such as by reporting or displaying. For example, animation on a video screen 24b in three-dimension and in color can effectively communicate study results. Also, a printed report, including information such as the dimensional distance between the HVAC assembly 30, other vehicle systems, or vehicle, further communicates study results.

The methodology advance to block 170 and regenerates the model to adjust the packaging or a functional criteria, based upon the analysis in block 150 or block 160. Referring to FIG. 7, the case 32 has been revised to avoid potential interference shown at 72 with the cross car support beam 70. Appropriate relationships between the HVAC air handling assembly 30, vehicle systems and the vehicle are automatically determined and revised according to the revised parameters. That is, the method of the present invention will automatically rebuild every other affected dimension so that packaging alternatives can be evaluated in a timely manner.

It should be appreciated that some changes to the design are selected by the user 26, while other changes are accomplished automatically by the method for designing the HVAC air handling assembly to accommodate user 26 specified modifications. Advantageously, packaging and functional alternatives may be quickly studied in a cost-effective manner. The methodology advances to bubble 180 and ends.

Figure 9:
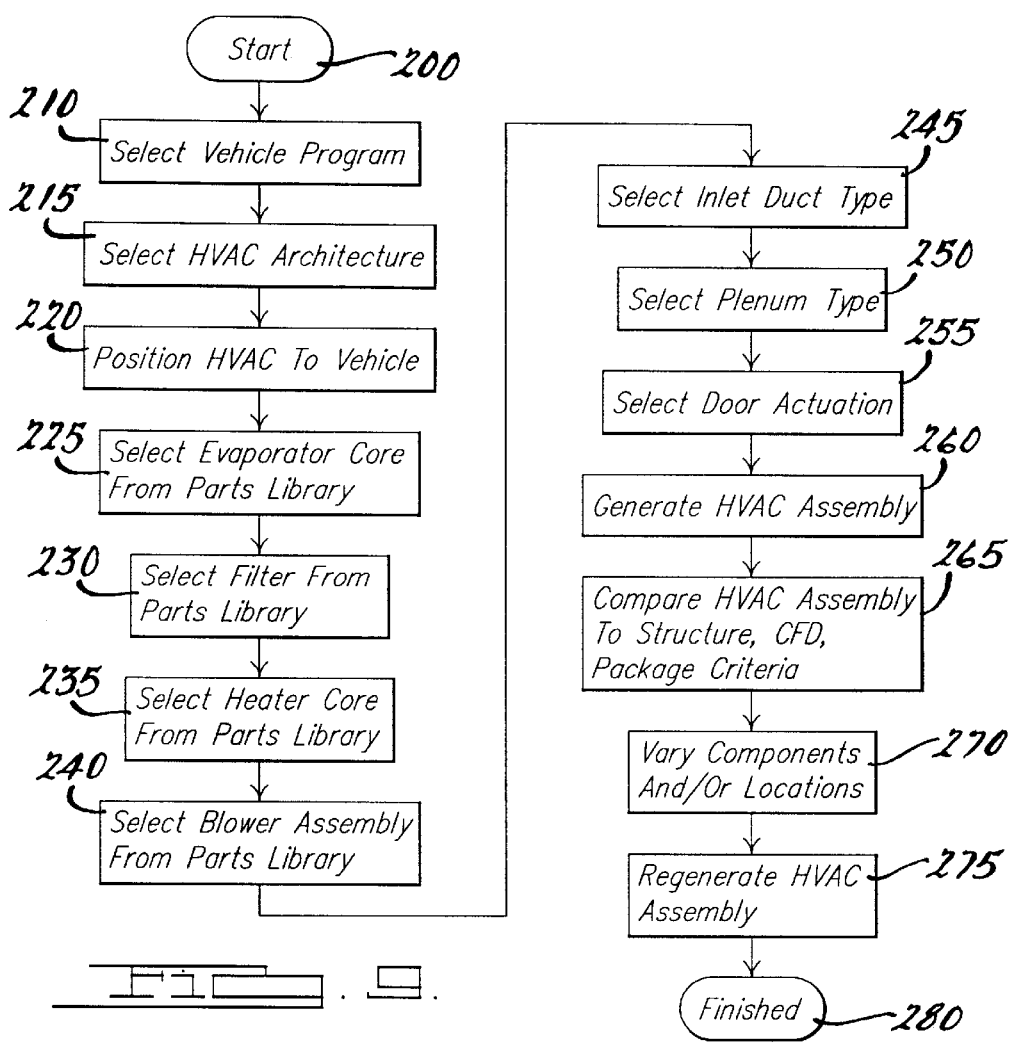
FIG. 9 is a flowchart of another embodiment of a method for designing a HVAC air handling assembly for a climate control system on a vehicle, according to the present invention, for the HVAC assembly of FIG. 2.

Referring to FIG. 9, a detailed example of one embodiment of the method of the present invention is shown beginning at bubble 200, when it is called for by the user 26. The methodology advances to block 210.

In block 210 the methodology selects a vehicle program from a vehicle platform library 14. The vehicle platform library 14 contains or has access to information in electronic form regarding the vehicle environment, including interior size and vehicle body style, and vehicle systems. In this example, information regarding the instrument panel and vehicle size is selected.

The methodology advances to block 215 and selects an architecture for the HVAC air handling assembly 30 from the component parts library 12. The architecture, as previously described, generally positions the 30 component parts of the air handling assembly 30 in relation to each other to define the shape of the HVAC case 32.

The methodology advances to block 220 and positions the HVAC air handling assembly 30 relative to the vehicle and the other vehicle systems, as previously described. Advantageously, positioning the HVAC air handling assembly 30 within the vehicle takes into account other vehicle systems selected by the user 26. In this example, the HVAC air handling assembly 30 is positioned under the instrument panel.

The methodology advances to block 225 and selects a specific evaporator core 48 from the component parts library 12. Advantageously, the user 26 can select an evaporator core 48 that meets specific performance criteria, such as size, heat transfer characteristics, resistance to airflow and drainage of moisture.

The methodology advances to block 230 and selects a specific filter 50 from the component parts library 12. Advantageously, the user can select a filter 50 based upon criteria such as case size, filter 50 effectiveness, and restriction to airflow.

The methodology advances to block 235 and selects a specific heater core 56 from the component parts library 12. The database of various heater cores 56 may be differentiated by heat rejection characteristics, restriction to airflow, heat transfer and size. Advantageously, the user can select a heater core 56 based on a specific performance need.

The methodology advances to block 240 and selects a specific blower scroll 42 and wheel 44 for the blower assembly 40 from the component parts library 12. The blower scroll 42 and wheel 44 comes in various sizes, depending on the airflow capacity, and power and torque of the blower motor 46.

The methodology advances to block 245 and selects an air inlet duct 34 type. One type of air inlet duct 34 includes a dual door, as is known in the art. Another type of air inlet duct 34 includes a non-flat-door. Also, the position and size of the outside air inlet opening 36 or inside air inlet opening 37 can be selected.

The methodology advances to block 250 and selects a specific plenum 58. One type of plenum 58 includes a three door system, as is known in the art. Another type of plenum 58 includes a two door system, as is likewise understood in the art. Another characteristic of the plenum 58 includes defroster opening 62 location.

The methodology advances to block 255 and selects a specific type of door actuator 54. One type of actuator 54 known in the art is vacuum assisted, to move the door from an open to a closed position. Another type of door actuator 54 is electronic and uses a motor. While still another type of door actuator 54 is mechanical and uses a cable. It should be appreciated that electrical and mechanical actuators are typically used on an air mix door 52.

The methodology advances to block 260 and generates a HVAC design 28 by positioning component parts, such as the evaporator core 48, filter 50, heater core 56, blower assembly 40, inlet air duct 34, plenum 58 and door actuators 54 within the selected HVAC architecture, and packages the HVAC air handling assembly 30 in relationship to the vehicle and vehicle systems selected as previously described. It should be appreciated to one skilled in the art that the HVAC air handling assembly 30 may include other component parts as required to operably transfer and condition the airflow.

The methodology advances to block 265 and compares the HVAC design 28 to the vehicle, and vehicle systems, in view of functional and packaging criteria, as previously described. It should be appreciated that in this example, packaging refers to the selection of a device, component or system and electrically representing such in a location proximate to other vehicle structures, so as not to interfere with adjacent components or structures as shown in FIG. 7. After the HVAC design 28 is packaged within the vehicle, various analytical studies may be performed using a computer aided engineering technique analysis such as CFD 20, to determine whether the functionality of the HVAC air handling assembly 30 meets a predetermined criteria. An example of a predetermined criteria is a temperature response of the conditioned air due to angular position of the blend door 52.

The methodology advances to block 270 and varies the HVAC design 28 based upon packaging and functional performance criteria. For example, if the clearance between a component of the HVAC air handling assembly 30 and a vehicle system is less than a predetermined distance, the component can be modified to improve the clearance. One type of modification is to modify the shape of the component part as shown for the case 32 in FIG. 7. Another type of modification is to vary the location of the component part.

The methodology advances to block 275 and regenerates the HVAC design 28. The regenerated HVAC design 28 takes into account all of the changes made in block 270, to create an improved HVAC air handling assembly 30 that better complies with the packaging and functional criteria. The methodology advances to block 280 and ends.

Referring to FIGS. 10A, 10B, 11 and 12, a detailed example of another embodiment of the method of the present invention is illustrated. The methodology begins at bubble 300, when it is called for by the user 26. The methodology advances to block 310.

In block 310, the methodology selects a vehicle program from the vehicle platform library 14, previously described. Advantageously, the vehicle platform library 14 contains parameters defining various vehicles and vehicle system characteristics, such as interior size and vehicle body style. The user 26 selects the parameters that are relevant to the design of the HVAC air handling assembly 30. In this example, the relevant vehicle systems are the instrument panel and the dash panel.

The methodology advances to block 315 and selects a HVAC architecture. In this example the architecture defines the shape of the outer surface of the case 32 for the HVAC air handling assembly 30, and the spatial relationship between the component parts in the HVAC air handling assembly 30. The HVAC architecture is selected from the component parts library 12, as previously described. Advantageously, for each generic component part of the HVAC air handling assembly 30, the library also contains more specific parts having unique shapes and functional performance characteristics.

Figure 10A:
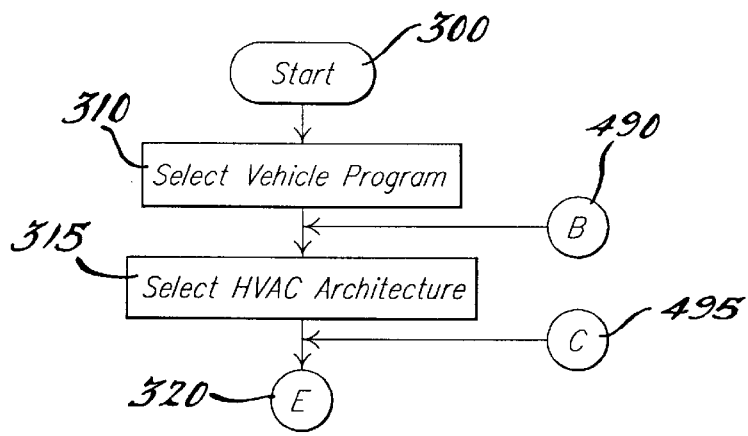
FIGS. 10a, 10b, 11 and 12 are flowcharts of still another embodiment of a method for designing a HVAC air handling assembly for a climate control system on a vehicle, according to the present invention, for the HVAC assembly of FIG. 2.
Figure 10B:
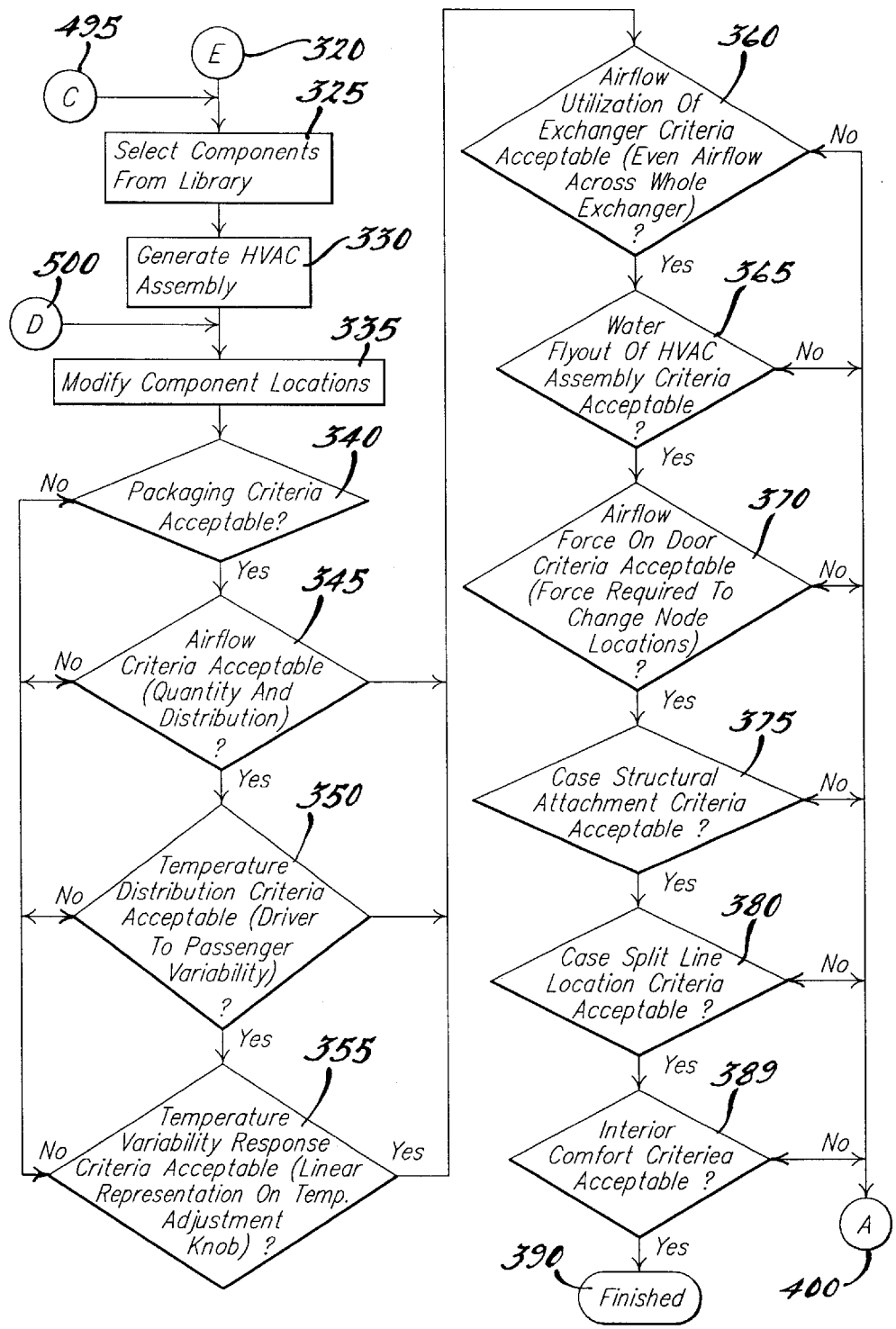

The methodology advances to circle 320, as shown in FIG. 10b, and continues to block 325. In block 325, the methodology selects the specific component parts of the HVAC air handling assembly 30 from the component parts library 12. The component parts of the HVAC air handling assembly 30 includes those components previously described with respect to FIGS. 2 through 8. However, one skilled in the art may utilize other component parts not described herein.

The methodology advances to block 330. In block 330 the methodology uses the selected HVAC architecture, specific component parts and vehicle program to generate the HVAC design 28 relative to the vehicle and vehicle systems selected.

The methodology advances to block 335 and modifies the location of the HVAC assembly 30 component parts within the HVAC design 28 relative to the vehicle and vehicle systems.

The methodology advances to diamond 340 and determines if a predetermined packaging criteria is met. Packaging refers to the electrical representation of the proximate position of one component relative to another component, as previously described. An example of a packaging criteria is a minimum dimensional difference or clearance between two surfaces. An example of a clearance is one-quarter inch (¼). If the packaging criteria is not met, the methodology advances to circle 400, shown in FIG. 11, and continues in a manner to be described.

If the packaging criteria is met, the methodology advances to diamond 345 and determines if a predetermined airflow criteria is met. An example of an airflow criteria is the quantity of airflowing through the HVAC air handling assembly 30 to provide adequate occupant comfort. Another example of an airflow criteria is an airflow distribution through the case 32, as illustrated in FIG. 8. If the airflow criteria is not met, the methodology advances to circle 400, shown in FIG. 11, and continues in a manner to be described.

If the airflow criteria is met, the methodology advances to diamond 350. In diamond 350 the methodology determines if a predetermined temperature distribution criteria is met using a technique such as CFD. An example of a temperature criteria is a variability in the exit temperature of the air exiting an outlet, such as the driver side floor duct 64, versus another outlet such as the passenger side floor duct 64. If the airflow criteria is not met, the methodology advances to circle 400, shown in FIG. 11, and continues in a manner to be described.

If the airflow criteria is met, the methodology advances to diamond 355. In diamond 355 the methodology determines if a predetermined temperature variability response criteria is met using a technique such as CFD. An example of a temperature variability response is whether the change in temperature is linear, in response to a change in position of a temperature adjustment knob. If the airflow criteria is not met, the methodology advances to circle 400, shown in FIG. 11, and continues in a manner to be described.

If the temperature variability response criteria is met, the methodology advances to diamond 360. In diamond 360 the methodology determines if a predetermined airflow utilization criteria is met for the heater core 48 using a technique such as CFD. An example of an airflow utilization criteria is if there is a uniform distribution of air across the entire heater core 48. If the criteria is not met, the methodology advances to circle 400, shown in FIG. 11 and continues in a manner to be described.

If the airflow utilization criteria is met, the methodology advances to diamond 365. In diamond 365 the methodology determines if a predetermined water fly-out criteria for the HVAC assembly air handling 30 is a met using a technique such as CFD. An example of a water fly-out criteria is if an airflow velocity is less than a predetermined velocity, so that any condensation on the evaporator core 48 is contained within the HVAC air handling assembly 30. If the water fly-out criteria is not met, the methodology advances to circle 400, shown in FIG. 11, and continues in a manner to be described.

If the water fly-out criteria is met, the methodology advances to diamond 370. In diamond 370, the methodology determines if a predetermined airflow force on a door criteria is met using a technique such as CFD. An example of an airflow force criteria is if the measured force on the door is greater than a predetermined maximum force. If the airflow force criteria is not met, the methodology advances to circle 400, shown in FIG. 11, and continues in a manner to be described.

If the airflow force criteria is met, the methodology advances to diamond 375. In diamond 375 the methodology determines if a predetermined case structural attachment criteria is met using a technique such as CFD. An example of a case structural criteria is if the force necessary to break the case 32 off from the dash panel or instrument panel is greater than a predetermined breaking force or stress concentration. If the case structural attachment criteria is not met, the methodology advances to circle 400, shown in FIG. 11, and continues in a manner to be described.

If the case structural criteria is met, the methodology advances to diamond 380. In diamond 380, the methodology determines if a predetermined case 32 split line criteria is met using a technique such as CFD. It should be appreciated that in this example the case 32 for the HVAC air handling assembly 30 is injected molded in two separate parts that are joined together. The seam, or split line location, as it is referred to in the art, is where the pieces are joined together. An example of a split line criteria is if the split line location affects the manufacturability of the case. If the case split line criteria is not met, the methodology advances to circle 400, shown in FIG. 11, and continues in a manner to be described.

If the case split line criteria is met, the methodology advances to diamond 385. In diamond 385 the methodology determines if a predetermined occupant interior comfort criteria is acceptable using a technique such as CFD. An example of an occupant interior comfort criteria is if the temperature output range of the HVAC air handling assembly 30 is within a predetermined temperature range. Another example of a criteria is if the airflow within the occupant compartment is within a predetermined airflow level. If the occupant interior comfort criteria is not acceptable, the methodology advances to circle 400, shown in FIG. 11, and continues in a manner to be described. If the occupant interior comfort criteria is met, the methodology advances to bubble 390 and the methodology ends.

Figure 11:
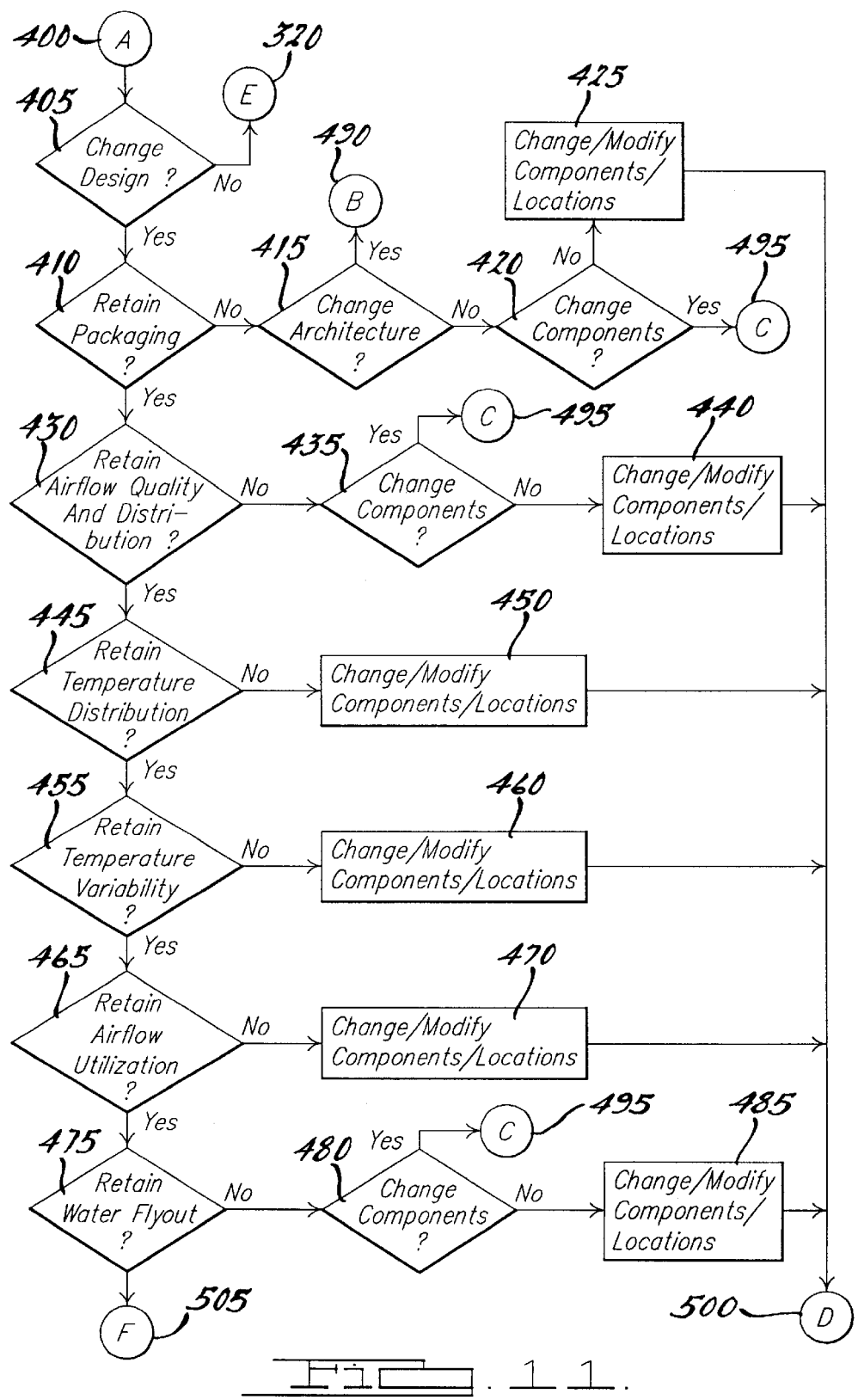

Referring back to circle 400, shown in FIG. 11, the methodology advances to diamond 405. In diamond 405 the methodology determine whether the HVAC design 28 should be changed. If the HVAC design 28 should not be changed, the methodology advances to circle 390, shown in FIG. 12, and is finished in a manner to be described.

If the design should be changed, the methodology advances to diamond 410. In diamond 410 the methodology determines whether the HVAC packaging of the HVAC air handling assembly 30 should be retained. If the HVAC packaging should not be retained, the methodology advances to diamond 415. In diamond 415 the methodology determines if the HVAC architecture should be changed. If the HVAC architecture should be changed, the methodology advances to circle 490, shown in FIG. 10*a*.

If the HVAC architecture should not be changed, the methodology advances to diamond 420. In diamond 420 the methodology determines if the specific HVAC component parts should be changed. If the specific HVAC component parts should be changed, the methodology advances to circle 495, shown in FIG. 10*b*. If the specific HVAC component parts should not be changed, the methodology advances to block 425. In block 425 the HVAC component parts location is changed or modified and the methodology advances to circle 500, shown in FIG. 10*b* and continues. It should be appreciated that a change in the HVAC component parts location regenerates the HVAC design 28.

Referring back to diamond 410, if the packaging is retained, the methodology advances to diamond 430. In diamond 430 the methodology determines if the airflow quality and distribution should be retained. If the airflow quality and distribution should not be retained, the methodology advances to diamond 435. In diamond 435 it is determined whether the specific HVAC component parts should be changed. If the specific HVAC component parts should be changed, the methodology advances to circle 495, shown in FIG. 10*b*. If the specific HVAC component parts should not be changed, the methodology advances to block 440. In block 440 the methodology changes or modifies the location of the HVAC component parts, and the methodology advances to circle 500, shown in FIG. 10*b*, and continues.

Referring back to diamond 430, if the airflow quality and distribution should be retained, the methodology advances to diamond 445. In diamond 445 the methodology determines if the temperature distribution should be retained. If the temperature distribution should not be retained, the methodology advances to block 450. In block 450 the methodology changes or modifies the location of the HVAC component parts, and the methodology advances to circle 500, shown in FIG. 10*b*, and continues.

If the temperature distribution should be retained, the methodology advances to diamond 455. In diamond 455 the methodology determines if the temperature variability should be retained. If the temperature variability should not be retained the methodology advances to block 460. In block 460 the methodology changes or modifies the location of the HVAC component parts, and the methodology advances to circle 500, shown in FIG. 10*b,* and continues.

If the temperature variability should be retained the methodology advances to diamond 465 and determines if the airflow utilization should be retained. If the airflow utilization should not be retained the methodology advances to block 470. In block 470 the methodology changes or modifies the location of the HVAC component parts, and the methodology advances to circle 500, shown in FIG. 10*b*, and continues.

If the airflow utilization should be retained, the methodology advances to diamond 475. In diamond 475 the methodology determines if the water fly-out velocity should be retained. If the water fly-out velocity should be retained, the methodology advances to circle 505, shown in FIG. 12 and continues in a manner to be described.

If the water fly-out velocity should not be retained, the methodology advances to diamond 480 and determines if the HVAC component parts should be changed. If the HVAC component parts should be changed the methodology advances to circle 495, shown in FIG. 10*b*, and continues.

If the HVAC component parts should not be changed, the methodology advances to block 485. In block 485 the methodology changes or modifies the location of the HVAC component parts, and the methodology advances to circle 500, shown in FIG. 10*b*, and continues.

Figure 12:
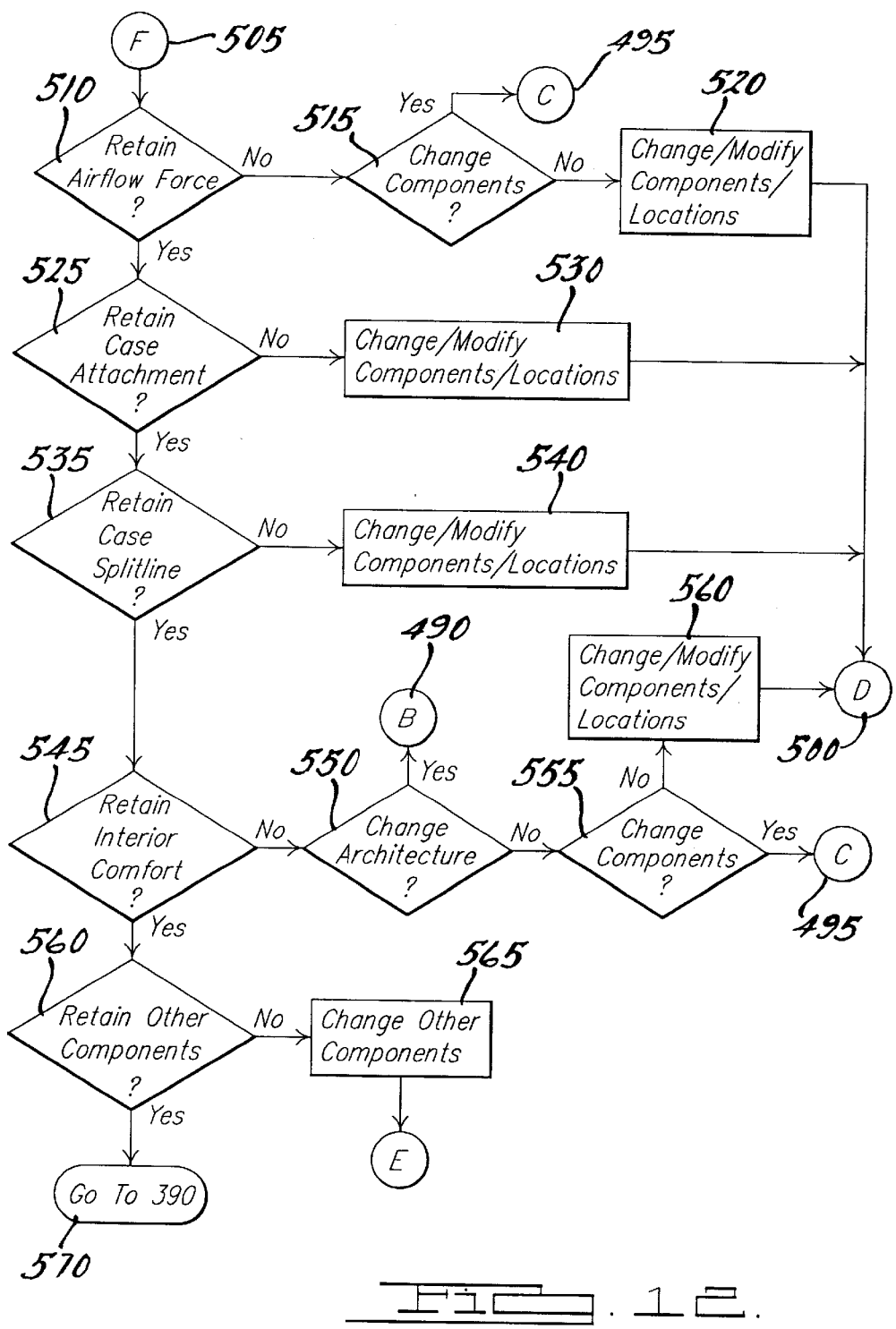

Referring back to circle 505, shown in FIG. 12, the methodology advances to diamond 510. In diamond 510 the methodology determines if the airflow force should be retained. If the airflow force should not be retained, the methodology advances to diamond 515 and determines if the HVAC component parts should be changed. If the HVAC component parts should be changed the methodology advances to circle 495, shown in FIG. 10*b*. If the HVAC component parts should not be changed, the methodology advances to block 520. In block 520 the methodology changes or modifies the location of the HVAC component parts, and the methodology advances to circle 500, shown in FIG. 10b, and continues.

Referring back to diamond 510, if the airflow force should be retained, the methodology advances to diamond 525. In diamond 525 the methodology determines if the case attachment should be retained. If the case attachment should not be retained the methodology advances to block 530. In block 530 the methodology changes or modifies the location of the HVAC component parts, and the methodology advances to circle 500, shown in FIG. 10b, and continues.

If the case attachment should be retained the methodology advances to diamond 535 and determines if the case split line should be retained. If the case split line should not be retained the methodology advances to block 540. In block 540 the methodology changes or modifies the location of the HVAC component parts, and the methodology advances to circle 500, shown in FIG. 10b, and continues.

If the case split line should be retained, the methodology advances to diamond 545. In diamond 545 the methodology determines if the interior comfort should be retained. If the interior comfort should not the retained, the methodology advances to diamond 550. In diamond 550 the methodology determines if the architecture should be changed. If the architecture should be changed the methodology advances to circle 490 shown in FIG. 10a. If the architecture should not be changed, the methodology advances to diamond 555 and determines if the HVAC component parts should be changed. If the component parts should be changed the methodology advances to circle 495 shown in FIG. 10a, and continues.

Referring back to diamond 555, if then HVAC component parts should not be changed, the methodology advances to block 560 and changes or modifies the location of the HVAC component parts. The methodology then advances to circle 500 shown in FIG. 10b, and continues.

Referring back to diamond 545, if the interior comfort should be retained the methodology advances to diamond 565. In diamond 565 the methodology determines if other components, not part of the HVAC air handling assembly 30 should be retained. If the other components should not be retained the methodology advances to block 570 and changes the other components. If the other components should be retained, the methodology advances to bubble 575, and the methodology advances to bubble 390 and ends.

Referring to FIG. 13, a representative system 600 for implementing the method for designing the HVAC air handling assembly 30, according to the present invention, is illustrated. The system 600 includes a processing unit 602 connected to a user interface which may include a display terminal 604, a keyboard 606, a pointing device, such as a mouse 608, and the like. The processing unit preferably includes a central processing unit, a memory, and stored instructions which implement the method for designing the HVAC air handling assembly 30 according to the present invention. The stored instructions may be stored within the processing unit 602 in the memory, or in any non-volatile storage such as magnetic or optical media, EPROM, EEPROM, or the like. Alternatively, instructions may be loaded from removal magnetic media 610, such as a removal disk, sometimes called a floppy disk, optical media 612, or the like. In a preferred embodiment, the system 600 includes a general purpose computer program to implement the functions illustrated and described with reference to FIGS. 1–12. Of course, a system 600 according to the present invention could also be embodied with a dedicated device which includes various combinations of hardware and software. The preferred embodiment may also include a printer 614 connected to the processing unit 602, as well as a network connection 616 for accessing a local server, an intranet, and the Internet. Preferably, solid modeling software, parametric design software, surface rendering software, animation software, and the like are used for developing a system 600, according to the present invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for designing a HVAC air handling assembly for a climate control system on a vehicle comprising:

selecting an architecture for the HVAC air handling assembly from a library stored in a memory of a computer system;

positioning the HVAC air handling assembly within the vehicle;

selecting a HVAC component part from the library;

generating a HVAC design of the HVAC air handling assembly spatially related to the vehicle using the HVAC architecture and the HVAC component part;

determining if the HVAC design meets a predetermined criteria; and regenerating the HVAC design if the HVAC design does not meet the predetermined criteria.

2. A method as set forth in claim 1 wherein a computer aided engineering analytical technique is used to determine whether the HVAC design meets a predetermined functional criteria.

3. A method as set forth in claim 1 wherein a computer aided engineering analytical technique is used determine whether the HVAC air handling assembly meets a predetermined packaging criteria.

4. A method as set forth in claim 1 wherein the library defines the HVAC air handling assembly component part in an electronically stored component parts library.

5. A method as set forth in claim 1 wherein the library defines the HVAC architecture in an electronically stored component parts library.

6. A method for designing a HVAC air handling assembly for a climate control system on a vehicle comprising:

selecting a vehicle design from a vehicle library stored in a memory of a computer system;

selecting an architecture for the HVAC air handling assembly from a component parts library stored in a memory of the computer system;

positioning the HVAC air handling assembly within the vehicle design selecting a HVAC component part from the component part library;

generating a HVAC design of the HVAC air handling assembly spatially related to the vehicle design using the HVAC architecture and the HVAC component part;

determining if the HVAC design meets a predetermined criteria; and modifying the HVAC design if the HVAC design does not meet the predetermined criteria and regenerating the HVAC design.

7. A method as set forth in claim 6 wherein said step of selecting a HVAC assembly component part includes selecting an evaporator core from the component parts library.

8. A method as set forth in claim 7 wherein said step of selecting a HVAC assembly component part includes selecting a filter from the component parts library.

9. A method as set forth in claim 8 wherein said step of selecting a HVAC component part includes selecting a heater core from the component parts library.

10. A method as set forth in claim 9 wherein said step of selecting a HVAC component part includes selecting a blower assembly from the component parts library.

11. A method as set forth in claim 10 wherein said step of selecting a HVAC component part includes selecting an inlet duct type from the component parts library.

12. A method as set forth in claim 11 wherein said step of selecting a HVAC component part includes selecting a plenum type from the component parts library.

13. A method as set forth in claim 12 wherein said step of selecting a HVAC component part includes selecting a door actuator from the component parts library.

14. A method as set forth in claim 13 wherein a computer aided engineering analytical technique is used to determine whether the HVAC design meets a predetermined functional criteria.

15. A method as set forth in claim 14 wherein a computer aided engineering analytical technique is used to determine whether the HVAC design meets a predetermined packaging criteria.

16. A method as set forth in claim 15 wherein the component parts library defines the HVAC component part in an electronically stored library.

17. A method as set forth in claim 16 wherein the component parts library defines the HVAC architecture in an electronically stored parts library.

18. A method as set forth in claim 17 wherein the vehicle library defines the vehicle in an electronically stored library.

19. A method for designing a HVAC air handling assembly for a climate control system on a vehicle comprising:

selecting a vehicle design from a vehicle library stored in a memory of a computer system;

selecting an architecture for the HVAC air handling assembly from a component parts library stored in a memory of the computer system;

positioning the HVAC air handling assembly within the vehicle design;

selecting a HVAC component part from the component parts library;

generating a HVAC design of the HVAC air handling assembly spatially related to the vehicle design using the HVAC architecture and the HVAC component part;

modifying the HVAC component part locations;

determining if the HVAC design meets the predetermined packaging criteria;

determining if the HVAC design meets a predtermined functional criteria;

determining if the HVAC design should be changed if the packaging criteria is not met and keeping the HVAC design if determined that the HVAC assembly design should not be changed;

determining if a packaging of the HVAC air handling assembly in the vehicle design should be retained if determined that the HVAC air handling assembly design should be changed;

modifying the packaging of the HVAC air handling assembly in the vehicle design if determined that the packaging should not be retained;

determining if a functional criteria of the HVAC design should be retained; and modifying the HVAC component part if the HVAC design should not be retained and regenerating the HVAC design.

* * * * *